Sept. 23, 1924.
E. J. HANNA
CHUCK
Filed Feb. 6, 1924
1,509,510
2 Sheets-Sheet 1
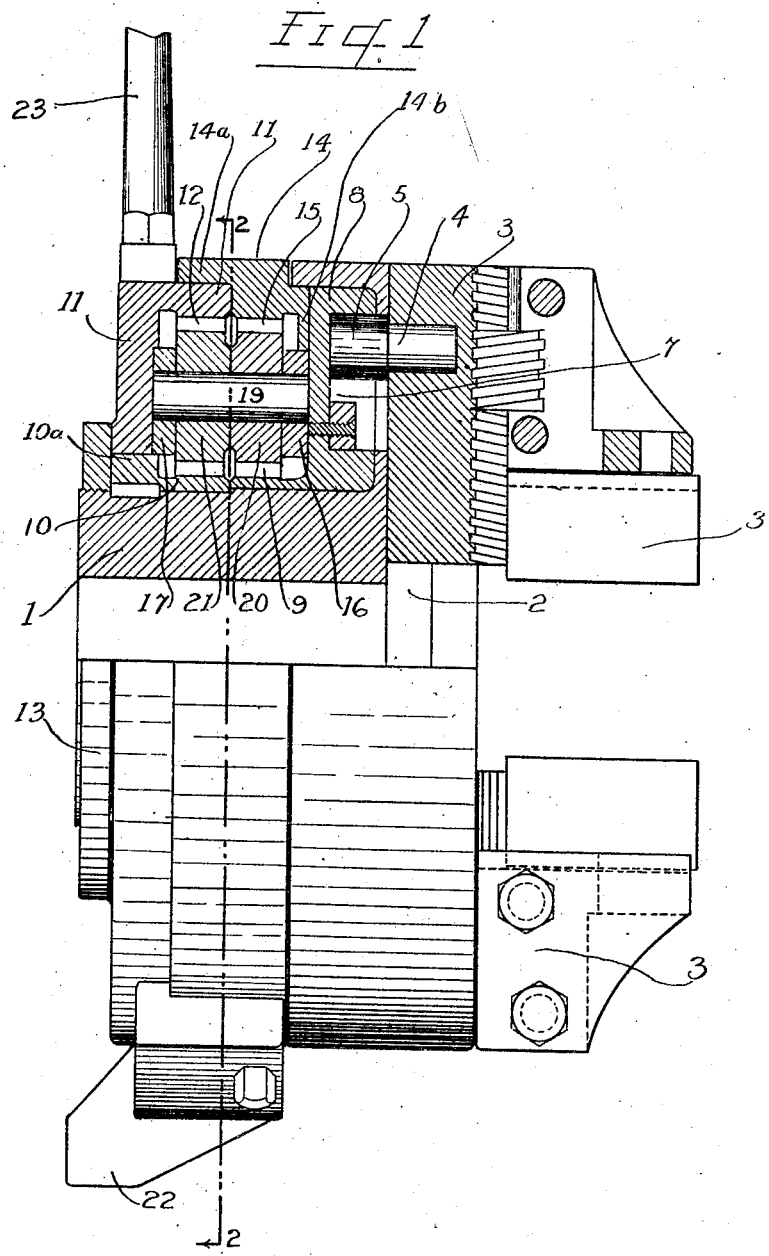
Inventor
Ellsworth Jule Hanna,
by
Attys.

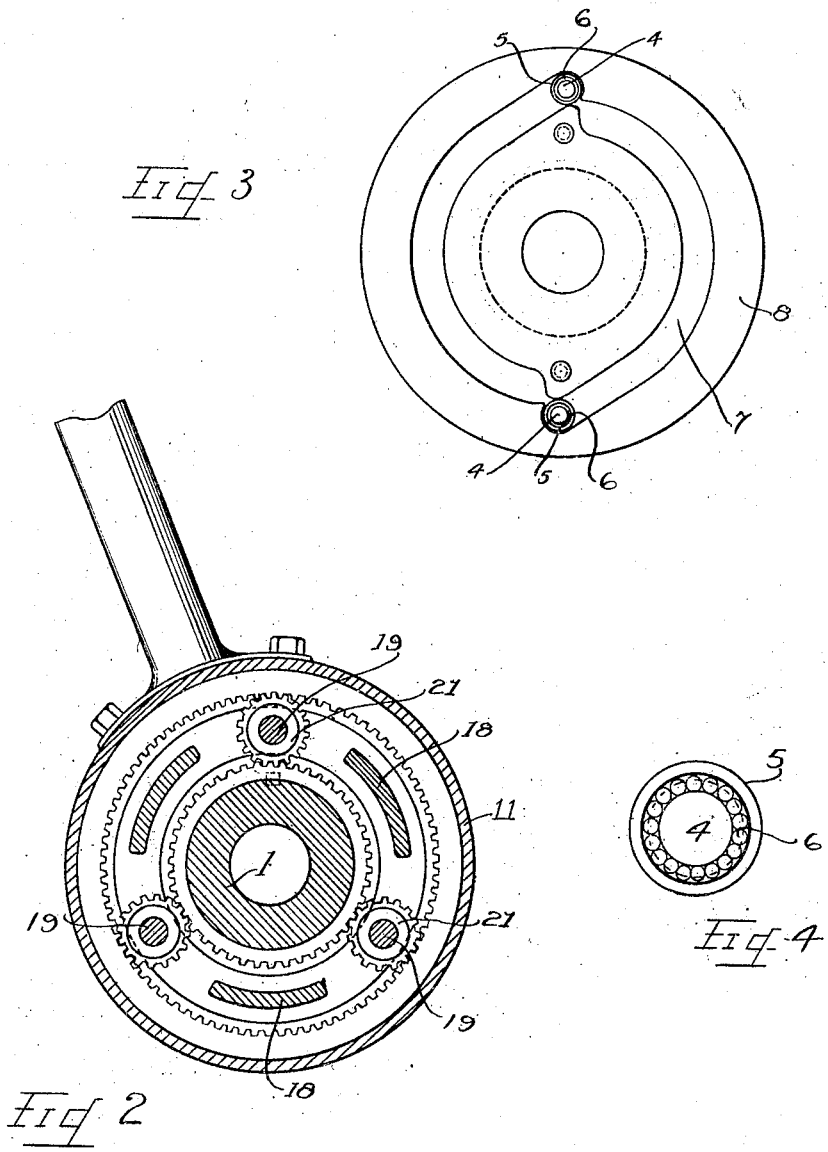

Patented Sept. 23, 1924.

1,509,510

UNITED STATES PATENT OFFICE.

ELLSWORTH JULE HANNA, OF CHICAGO, ILLINOIS, ASSIGNOR TO THOMAS ELEVATOR COMPANY, OF CHICAGO, ILLINOIS, A CORPORATION OF ILLINOIS.

CHUCK.

Application filed February 6, 1924. Serial No. 690,938.

*To all whom it may concern:*

Be it known that I, ELLSWORTH JULE HANNA, a citizen of the United States, and a resident of the city of Chicago, in the county of Cook and State of Illinois, have invented certain new and useful Improvements in a Chuck; and I hereby declare that the following is a full, clear, and exact description of the same, reference being had to the accompanying drawings, and to the numerals of reference marked thereon, which form a part of this specification.

This invention relates to a chuck designed for use upon lathes and other similar machine tools and concerns itself primarily with an arrangement that results in a more accurate adjustment of the jaws and a much greater ease in effecting such an adjustment.

The invention comprises the novel mechanism and combinations hereinafter described and more particularly pointed out and defined in the appended claims.

In the accompanying drawings which illustrate a preferred form of this invention and in which similar reference numerals refer to similar features in the different views.

Figure 1 is a part elevational and part sectional view of the chuck.

Figure 2 is a reduced sectional view upon the line 2—2 of Figure 1.

Figure 3 is a plan view of the cam disk.

Figure 4 is an end view of one of the cam engaging rollers.

Referring to the drawing, the reference numeral 1 represents the hub of a chuck provided with the usual radial grooves 2 in one face in which the clutch jaws 3 are slidingly mounted. A stud 4 projects from the rear face of each jaw, and a roller 5 is mounted upon anti-friction elements 6 in the form of small rollers surrounding the projecting end of each stud. These rollers travel in a cam groove arranged in a cam gear 8 rotatably mounted upon the hub of the chuck. The teeth 9 of this cam gear are formed upon an inwardly directed lateral flange as shown in Figure 1. A hub gear 10 is keyed upon the hub 1 adjacent the cam gear, and has a similar diameter as the cam gear. This hub gear has an outer raised bearing $10^a$ upon which a ring gear 11 is rotatably mounted. The teeth 12 on this ring gear are formed interiorly of an inwardly directed annular flange $11^a$. A collar 13 is screwed upon the end of the hub 1 and confines the hub gear 10 and ring gear 11 in position.

A stationary ring gear 14 is positioned adjacent the inner side of the ring gear 11. This stationary gear has a flange $14^a$ surrounding the outer periphery of the ring gear 11. The inner end of this flange $14^a$ terminates in an annular shoulder against which the end of the ring gear bears. The interior periphery of this shoulder is provided with teeth 15 in alinement with the teeth 12 of the ring gear. The inner side of the stationary gear 14 has an inwardly extending annular bearing flange $14^b$.

A spider comprising side rings 16 and 17 connected by webs 18 (Fig. 2) is rotatably supported between the gears on the hub 1 and the interior ring gear 11 and stationary gear 14 and bears against the flange $14^b$ and a shoulder on the ring gear 11. Shafts 19 are carried by the spider and a pair of planet gears 20 and 21 are loosely journalled upon each shaft; the planet gear 20 meshing with the cam gear 8 and the stationary gear 14, and the planet gear 21 meshing with the hub gear 10 and the ring gear 11. The stationary gear 14 is attached to the machine frame by means of a bracket 22 or the like. The ring gear 11 is provided with an operating handle 23.

In prior constructions, the gear 11 was the stationary gear, and the gear 14 was the rotatable ring gear for adjusting the jaws. In rotating this prior ring gear, it became more or less jammed so it was frequently very difficult to adjust the jaws 3 of the chuck. Further, the action of the prior ring gear was a mere rotative action upon the planet gear 20 in cases where the hub 1 was not rotating.

It will be appreciated that by journalling the manually rotatable ring gear 11 upon the bearing $10^a$ which is substantially a part of the hub 1, and nearer the center of rotation than the flange $11^a$ around which the prior ring gear rotated, the effective leverage for rotating the ring gear 11 with respect to the friction engendered by its bearings will be increased. The rotation of the ring gear 11 will also always tend to rotate the spider of the planet gears, thuswise making it easier to rotate the cam gear.

I am aware that many changes may be made, and numerous details of construction may be varied through a wide range without departing from the principles of this invention, and I therefore do not purpose limiting the patent granted hereon, otherwise than necessitated by the prior art.

I claim as my invention:

1. In a chuck, a hub having grooves in one face, jaw member supported in said grooves, studs projecting from the rear face of said jaws, rollers mounted upon said studs, a cam gear rotatably mounted upon said hub and having a cam groove for receiving said rollers, a hub gear keyed upon said hub, adjacent said cam gear, and provided with a bearing, a rotatable ring gear supported upon said bearing, and provided with interior teeth, a stationary gear having internal teeth secured adjacent the inner side of said ring gear, and a rotatable spider having planet gears mounted upon said hub, the planet gears meshing with the forementioned gears.

2. The combination with the jaws of a chuck, of a rotatable cam gear for adjusting the same, means for rotating said cam gear, comprising a series of planet gears in mesh with said cam gear, a stationary internal gear also in mesh with said planet gears, a second series of planet gears supported coaxially of said first planet gear, a hub gear for engaging said second series of planet gears and a manually rotatable internal ring gear having a bearing upon said hub gear and meshing with said second series of planet gears.

In testimony whereof I have hereunto subscribed my name in the presence of two subscribing witnesses:

ELLSWORTH JULE HANNA.

Witnesses:
FRED E. PAESLER,
OSCAR HARTMANN.